United States Patent [19]
Burkhalter et al.

[11] 4,367,093
[45] Jan. 4, 1983

[54] WELL CEMENTING PROCESS AND GASIFIED CEMENTS USEFUL THEREIN

[75] Inventors: John F. Burkhalter; Jerry D. Childs; David L. Sutton, all of Duncan, Okla.

[73] Assignee: Halliburton Company, Duncan, Okla.

[21] Appl. No.: 282,321

[22] Filed: Jul. 10, 1981

[51] Int. Cl.³ .................................................. C04B 7/00
[52] U.S. Cl. ........................................ 106/87; 106/90; 166/293
[58] Field of Search .......................... 106/87, 90, 290; 166/293

[56] References Cited

U.S. PATENT DOCUMENTS 3,918,984 11/1975 High et al. .......................... 106/290
4,304,298 12/1981 Sutton ................................ 106/87

*Primary Examiner*—James Poer
*Attorney, Agent, or Firm*—G. Keith deBrucky; Edward F. Sherer; Thomas R. Weaver

[57] ABSTRACT

A process and method for cementing adjacent to a subterranean gas containing zone. The cementing compositions comprise a hydraulic cement, aluminum powder ot generate hydrogen gas, and an inhibitor which retards the generation of hydrogen gas produced by the aluminum powder.

25 Claims, No Drawings

WELL CEMENTING PROCESS AND GASIFIED CEMENTS USEFUL THEREIN

The present invention relates to cement compositions, and more particularly to the use of hydraulic cement compositions for sealing or cementing subterranean zones penetrated by a bore hole, such as cementing the annular space between an oil and/or gas well casing and the surrounding formation. In particular, the invention relates to an improved hydraulic cement slurry in which a stabilized and dispersed gas is generated at a controlled rate for cementing zones which contain gas under pressure, so that emission and flow of gas from the formation into the bore hole or well annulus is suppressed or controlled by the counteractive pressure resulting from the inclusion of gas in the cement slurry prior to the time that the cement composition sets to a hardened state.

In the production of hydrocarbons from a subterranean formation, the subterranean formation is usually cemented or sealed by pumping an aqueous hydraulic cement slurry into the annulus between the pipe and the formation. In the placement of cement in the annular space between the casing of an oil well and the surrounding subterranean environment, the cement slurry is commonly pumped down inside the casing and back up the annular space outside the casing. Occasionally, the cement is introduced directly into the annular space at the outer side of the casing. Where the cement has been pumped down the casing initially, any cement slurry which remains in the casing is displaced into the annulus by a suitable fluid or fluids.

On some occasions, the zones adjacent the cement-containing annulus contain connate gas under substantial pressure. In these instances, an undesirable phenomenon referred to in the art as gas leakage is sometimes encountered in which formation gas enters the annular space which surrounds the well casing after the primary cementing slurry has been placed and before the cement is sufficiently set or gelled to prevent gas percolation. This gas can migrate to the surface, or other subterranean zones, through the annulus and the cement, forming a permanent flow channel or a highly permeable cement, and the leakage of such gas continues after the cement slurry has taken a final set. Such gas leakage is detrimental to the long-term integrity and sealing efficiency of the cement in the annulus, and the magnitude of such leakage is often enough to require an expensive remedial squeeze cementing job to be carried out to suppress or stop the gas leakage. Such gas leakage can cause high volume blow-outs shortly after cement replacement and before the cement has initially set.

Gas leakage occurs even though the initial hydrostatic pressure throughout the column of cement slurry placed in the annulus far exceeds the pressure of the gas in the formation from which the leaking gas originates. It is theorized that two different well bore conditions can occur which allow gas entry into the annulus.

The first condition which is believed to cause gas leakage is the partial setting, gellation, or dehydration at a specific or isolated portion of the cemented annulus. This can be due to partial dehydration, cement exposure to higher temperatures for longer periods of time, etc. This, therefore, prevents or restricts the transfer of hydrostatic pressure to the cement contained in the annulus below this point.

The next condition which can occur is failure to transmit hydrostatic pressure when the entire cemented annulus is in the same state of physical dehydration and chemical hydration without the partial localized setting referred to in the first condition. In this situation, the cement has left the fluid state due to its hydration or gellation, but has not yet reached the solid state and therefore does not act or behave as a true hydraulic system. When this point of hydration is reached, the cement column will not transmit full hydrostatic pressure in the manner of a true fluid or liquid slurry. After this time, any reduction or volume due to fluid loss or shrinkage of the cement volume due to chemical hydration will cause pressure reduction within the annulus and the subsequent entry of gas.

Either of these conditions results in the hydrostatic pressure in some portion or all of the column being relieved, thereby allowing the gas to pass into the annular space and traverse the cement column.

Interestingly, the gelled or partially set cement, although it is incapable of maintaining or transmitting full hydrostatic pressure, still is not sufficiently rigid or set to prevent the entry of gas into the annulus and the upward perculation of the gas. According to the most popular theories, an absolute volume reduction occurring after the cement column can no longer transmit full pressure reduces the pore pressure of the still semi-plastic slurry. When the pore pressure falls below the formation gas pressure, formation gas leaks into the well bore and if the cement is not gelled enough to prevent perculation, gas leakage channels are formed. Two principal mechanisms which act to decrease pore pressure are the hydration reaction of cement and the loss of filtrate to the adjacent permeable formation.

Gas leakage problems have been noticed following casing cementing operations on surface conductor, intermediate, production, and liner jobs. Gas returns to the surface have often been noticed within 1 to 7 hours after placement of the cement. Many times, however, the gas flow does not return to the surface, but flows into low pressure zones causing interzonal gas communication.

In U.S. patent application Ser. No. 038,022, filed May 10, 1979, now U.S. Pat. No. 4,304,298 which is assigned to the assignee of the present application and is herein incorporated by reference, in an effort to prevent gas leakage, the use of a cement slurry containing a stabilized, dispersed gas is described. Enough gas is present in the cement slurry of this invention to prevent gas under pressure from passing into or around the cement prior to the time the cement has set or gelled sufficiently to prevent perculation. The entrained gas, by virtue of its compressibility, reduces the magnitude of the pressure drop decrease resulting from slurry volume reduction. It is there stated that the preferred method of forming gas in situ in the cement is the use of metals which react with alkaline solutions or with water to yield hydrogen and the most preferred gas generating material is powdered aluminum.

The present invention provides a cement composition and a method of cementing a subterranean formation whereby the rate of release of the hydrogen gas formed from aluminum is controlled.

In accordance with the invention, there is provided a cement composition comprising a hydraulic cement, water, aluminum metal, which yields an amount of gas which is effective and useful, and a compound which retards the reaction rate of the aluminum compound and thus causes delayed hydrogen gas generation for the cement. Optionally, a fluid loss additive can be added to the above described composition. The principals of the invention are applicable not only to oil and/or gas wells, but also to water wells and even to fluid conveyance pipelines laid in the earth.

Where terms such as "set time" and other nomenclature conventionally employed in the oil well cementing terminology are utilized, further clarification as to the connotations thereof is available from Bulletin 10-C of the American Petroleum Institute, which is incorporated herein by reference.

Stable volume is defined as a volume of gas at in-place conditions after the water phase is saturated with dissolved gas and any reactions between the generated gas and other slurry components are sufficiently complete but no significant reduction in gas volume occurs before set time. To result in a stable volume of gas, the generated gas must have limited solubility in the water phase of the cement slurry, and the gas must not liquefy at in-place temperature and pressure conditions.

A useful volume is defined as at least 0.10 SCF/CF of slurry without gas, or the amount of gas needed to effect an in-place compressibility increase of at least 25% over the in-place compressibility of the slurry without gas.

In the method of forming the gas in situ in the cement, aluminum is utilized as the gas generating means. Aluminum reacts with the hydroxides contained in the cement slurry or with the water to yield hydrogen. An amount of aluminum is incorporated into the cement slurry which is adequate to increase the compressibility under downhole conditions by at least 25% in relation to the initial compressibility of the same slurry not containing the gas generating agent, namely aluminum. In order to accomplish this, the slurry contains at least 0.1 SCF of stabilized entrained gas per cubic foot of slurry, with the amount of gas increasing with well depth. In terms of the actual downhole volumetric amount of gas included in the slurry, this will generally be from about 0.5 volume percent up to about 20 volume percent, with the actual amount depending upon the temperature and pressure conditions prevailing in the well, and to a lesser extent upon other additives which are used in the slurry.

With hydrogen, it is possible to estimate the amount of gas which must be included in the cement slurry in order to produce a 25% increase in compressibility over that which characterized the slurry without included gas. Such estimation is accomplished using the equations:

SCF/cubic ft. of slurry = $(0.1)(P_h/2000)^{1.1428}$

Gas Volume Percent (Downhole Conditions) = $(0.1)(P_h/1750)^{2.144}$

In the equations, $P_h$ is the pressure at the cementing locus, and the equations are based upon an assumed drop in $P_h$ of 10% and a neat slurry compressibility of 30 $(\mu v/v)/atm$.

In order to maintain hydrostatic pressure by in situ generation of gas within the slurry, or preliminary introduction of gas, it has been found sometimes desirable to include some form of fluid loss control means in the slurry, otherwise the gas volumes required to maintain hydrostatic pressure are excessive. In some instances, an agent should also be present for aiding in dispersing and stabilizing the generated gas.

Many materials are known which reduce the amount and rate of fluid loss from the slurry after it has been placed in the annulus. Other additives to oil well cements which are principally used for other reasons, such as retardation or as dispersing agent, also demonstrate, in some cases, some capacity for reducing fluid loss. A widely used measure of fluid loss from cement slurry is a standard API fluid loss test (API RP 10B, which is incorporated herein by reference), by which, under standard conditions, the amount of slurry filtrate which will pass through a standard screen of standard surface area in a given time is determined. The cement compositions of the present invention, when used in the process of this invention, are caused, either by the inclusion of an internal fluid loss control means, or by external conditions hereinafter described, to yield a fluid loss value of less than 1000 cc in 30 minutes under such API test conditions (325 mesh screen, 1000 psi) and at a temperature of 100° F. Preferably, the type and amount of additive used are such that not more than 850 cc of fluid are lost in such standard API test of the slurry at 100° F., and the most preferred slurries lose less than 500 cc under such testing conditions. Since occasionally, the stated limits of fluid loss may not be optimum in the case of some seldom used exotic cement mixtures, another useful measure of the tolerable fluid loss is a loss equivalent to not more than 75% of that which would characterize the neat blend of cement and water alone, and preferably not more than 50%.

With regard to the described fluid loss desiderata, it will be understood that the standard API fluid loss test conducted in the 325 mesh screen does not simulate several conditions which may exist in the actual bore hole. Two of these are:

(1) low permeability formations which are saturated with gas or oil or both. In this case the actual fluid loss from the slurry contained in the bore hole may be less than that measured by the standard fluid loss test. As the formation permeability decreases, the rate at which the fluid can be lost can be affected by the formation permeability based on Darcy's radial flow equation, and the effect of the fluid and/or gas contained in the zone; and (2) the mud cake deposited during drilling operations may not be totally removed during the cementing operation, and thus limits filtrate loss from the cement slurry.

It is, therefore, possible in some cases that satisfactory fluid loss control of the slurry can be achieved by extrinsic conditions existing in the bore hole prior to and during the cement operation. Since these conditions are not completely determinable with certainty, fluid loss additives may be used when, in fact, the well conditions provide sufficient filtrate limitations. In some wells, based on past experience, it may be known that such conditions do exist, and therefore the control of filtrate loss need not necessarily be provided by the addition of special fluid loss control chemicals.

Any fluid loss mechanism which adequately limits cement filtrate loss in accordance with the criteria described above is suitable for use in the process of the invention, provided it is compatible in the sense hereinbefore defined. Some well known types of fluid loss additives are cellulose derivatives, such as hydroxymethylhydroxyethyl cellulose and hydroxyethyl cellulose, lignin, ligno-sulfonates, polyacrylamides, modified polysaccharides, polyaromatic sulfonates and guar gum derivatives or mixtures of two or more of the foregoing. A preferred fluid loss material used in the cement composition is a commercially available blend or mixture of a cellulose derivative or modified polysaccharide with a dispersant constituted by a polymeric aromatic sulfonate. In general, where chemical additives are used to provide the necessary fluid loss reduction, an amount of from about 1.5 to about 3.0 weight percent based on cement is used.

Aluminum is utilized as the source of gas generated in the cement slurry and the amount of aluminum powder which is required in order to yield a specified volume percent of gas in the slurry increases with pressure, since the compressibility resulting from a specified percent gas volume developed within the slurry decreases with increasing pressure. Thus, for example, only 0.6 weight percent of aluminum is required to produce 5 percent by volume of hydrogen gas in a typical slurry in the case of an API casing schedule of 6,000 feet, and this amount of gas will, at the depth, yield a compressibility of 183.2 $(\mu v/v)$/atm., whereas 1.10 weight percent aluminum is required in the case of a 14,000 foot API casing schedule to produce the same volumetric amount of gas in the slurry and, under those conditions, the compressibility of the slurry is only 62.5 $(\mu v/v)$/atm. These comparisons are based upon the use of a neat slurry having an initial compressibility of 28 $(\mu v/v)$/atm.

The amount of gas which will be generated under given temperature and pressure conditions by a predetermined amount of aluminum powder can be predicted with considerable accuracy. From this, the increase in compressibility which will be attained can be precalculated. Thus, for example, under 10,000 foot API casing conditions, 1% aluminum added to a relatively standard Portland Cement containing a fluid loss additive can be predicted to yield a compressibility of at least 100 $(\mu v/v)$/atm.

In order to prevent premature gellation of the slurry which normally occurs using aluminum which decreases the capability of the slurry to transmit hydrostatic pressure, it may be necessary with some slurries to include a small amount of an alkaline earth metal halide, and preferably calcium chloride. This in turn sometimes requires the inclusion in the slurry of a retarder to offset an accelerating effect of the alkaline earth metal halide and slightly retard the thickening time.

It has been found that when the aluminum is mixed with the cement slurry, the reaction of aluminum to produce hydrogen occurs rapidly and in many instances, the hydrogen gas is released prior to the desired time, for instance, prior to the placing of the cement slurry into the annulus. This results in the inefficient use of the aluminum which is used to generate the hydrogen gas. In addition, hydrogen gas is extremely explosive and thus its generation at inappropriate times can be dangerous. Therefore, a chemical reaction inhibitor is incorporated into the cement slurry.

The chemical reaction inhibitor of the present invention that can be incorporated into the cement slurry are fatty acid esters of sorbitan such as sorbitan mono-oleate, sorbitan dioleate, sorbitan trioleate, triethanol amine and diisopropyl amine. When combined with aluminum, the inhibitors effectively retard the rate of release of hydrogen gas and thus cause release of hydrogen in the cement to occur at the desired time.

The amount of chemical inhibitor used in the cement slurry will depend upon the amount of time it is desired to delay the reaction of the aluminum to form the hydrogen and, therefore, there are really no set upper and lower limits. It has been found that generally the amount of inhibitor added to the slurry will be in the range of 0.10% to about 50.0% by weight of aluminum.

The rate of reaction of aluminum powder has also been determined to be proportional to the temperature with faster reaction rates occurring as the temperature increases. In addition, the reaction rates of aluminum can also be affected by the particular additives in the cement slurry. For example, some conventional retarders and fluid loss additives slow the reaction rate, while calcium chloride salt, or combination of salt and sodium thiosulfate, have been found to accelerate the rate of reaction in most cases.

It should be noted that the heat of the gas generating reaction of the aluminum powder is relatively high, and for this reason, in many instances, retarders are included in the slurry to prevent the thickening time from being unacceptably altered in response to the change of temperature occurring upon reaction of the aluminum. In further regard to the exothermal heat of reaction of aluminum, it should also be mentioned that another reason for the effectiveness of the aluminum powder in combating the problem of gas leakage within the well bore is that an increasing temperature in the in-place cement column results in thermal expansion which helps to offset the pore pressure reduction by reducing the overall volume reduction rate. Also, in some instances, the increase in temperature due to the aluminum reaction is large enough to accelerate the gel strength and initial set which can shorten the transition time. The shorter transition time decreases the volume reduction due to fluid loss and results in a high pore pressure at the end of the transition time.

In order to determine the period and rate of gas generation which is desirable, it is preferable to initially determine, prior to actual placement of this cement, the initial set time of the cement slurry to be treated in accordance with the present invention. This can be determined by analysis of the temperature profile of the slurry. These tests are preferably conducted with roughly equivalent amounts of gas generating additives and chemical inhibitors incorporated into the cement slurry as will be used in the final composition to be placed in the annulus.

The aluminum and the chemical inhibitor can be incorporated into the cement composition by any one of several methods generally known in the art. One procedure comprises mixing the aluminum with ethylene glycol adding the inhibitor into the aluminum and ethylene glycol to form a mixture, injecting the mixture into the cement slurry as it is being pumped into the subterranean formation. Another procedure comprises adding the inhibitor to an ethylene glycol and aluminum to form a mixture, stirring the mixture into water and adding the drying cement slurry to the mixture to make the desired cement slurry.

Based on the foregoing considerations, when the preferred aluminum-chemical inhibitor gas generation is utilized, the amount of aluminum added can vary but generally will be from about 0.02 weight percent to about 2 weight percent of dry cement. The amount of chemical inhibitor which may be employed in the powder can vary from about 0.5 weight percent to about 50.0 weight percent of aluminum. The percentages of the components in the gas generating material will vary as to whether the cementing is taking place in a relatively shallow well or a deep well of up to 30,000 feet or more.

The cement compositions constituted in accordance with the present invention for use in the process described generally include a hydraulic inorganic cement, water present in an amount in the range of from about 20 to about 135 percent by weight of the dry cement, and preferably from about 35 to 60 percent, optionally a fluid loss material present in an amount in the range of from about 1.5 to about 3.0 percent by weight of dry cement, aluminum varying but usually being present in an amount in the range of from about 0.02 to about 2 percent by weight of composition and an inhibitor present in the range of from about 0.1 to 50.0 percent by weight of aluminum. In addition, the cement can also contain calcium chloride or other inorganic accelerator compounds which function to prevent premature gellation of the cement. Calcium chloride, when used, is present in an amount from about 0.1 to about 3 percent by weight of dry cement, with 2 weight percent being preferred.

Portland Cement is generally preferred because of its low cost, availability and generally utility, but other cements such as pozzolanic cements, gypsum cements and high aluminum content cements can be utilized in the invention. Portland Cements of the API Classes H and G are the most preferred cements for use in the invention in most instances, although the other API classes of cement can also be utilized. The characteristics of these cements are described in API Specification 10-A which is incorporated herein by reference. A highly useful and effective slurry base composition for use in practicing the invention utilized API Class H cement mixed with water and other admixtures to provide a density of from about 10 to about 20 pounds per gallon.

The water used in the cement composition can be water from any source, provided that it should not contain an excess of organic compounds, or salts which may affect the stability of the cement composition.

Various types of well known conventional additives can be incorporated in the slurry to modify the properties of the initial set cement, and to alter the set times and curing rates of the slurry. Such additives include inter alia, viscosifiers or dispersants and weight adjusting materials.

Additional dispersing agents can be utilized to facilitate using lower quantities of water and to promote higher set cement strength. Friction reducers which promote freer movement of the unset composition, and allow ease of pumping through the annulus, can be incorporated in the slurry in amounts up to about 2.0 percent by weight of dry cement. Some dual function additives, such as ligno-sulfonates which function both as a dispersant and also as a set time retarder can be incorporated in the slurry where their use would be advantageous for certain cementing situations.

Accelerators, such as soluble inorganic salts in addition to calcium chloride, may be utilized up to 8 percent by weight of dry cement. Retarders, when utilized, are generally used in amounts of from about 0.1 weight percent up to about 5.0 percent by weight of dry cement.

Of the various types of fine aggregate or particulate filler materials which can be used, flyash, silica flour, fine sand, diatomaceous earth, light weight aggregate and hollow spheres can be sighted as typical. The use of these materials is well understood in the art, and so long as they are compatible with the stability of the gas of the composition of the invention, they can be employed over wide ranges of concentration.

As previously indicated, some of the foregoing conventional additives possess the capability of preventing unacceptably high fluid loss from the slurry during the curing period.

A preferred composition of the invention includes API Class H Portland Cement, water in an amount of from about 35 to 60 percent by weight of cement, a fluid loss material present in an amount of about 1 percent by weight of cement, calcium chloride present in an amount of 2 percent by weight of cement, aluminum powder in an amount of from about 0.1 to about 1.5 weight percent of cement, sorbitan mono-oleate in an amount of from about 0.50 to about 50.0 weight percent of aluminum. This composition is very effective in cementing wells ranging from a depth of 100 feet to about 20,000 feet.

The following examples will serve to more comprehensively illustrate the principles of the invention but is not intended to limit the bounds of the invention.

EXAMPLE I

Laboratory tests were carried out using slurries prepared with a bore slurry, namely Lone Star H Cement, and 48 percent water, aluminum, and a chemical inhibitor for delaying the reaction rate of aluminum to form hydrogen, were added to the bore slurry. The amount of hydrogen generated was determined at various time intervals. Test 1 contained no inhibitor and was run for merely illustrative purposes. The amount of hydrogen generated was determined using standard laboratory procedures. The results of these tests are set forth in Table I.

TABLE I

Reaction of Treated Aluminum in a Cement Slurry.

| Test No. | Inhibitor | wt. Inhibitor/ wt. Aluminum | Percent Reaction of Aluminum | | | | |
|---|---|---|---|---|---|---|---|
| | | | 30 min | 60 min | 120 min | 240 min | 360 min |
| 1 | None | 0.0 | 60 | 75 | — | — | — |
| 2 | Sorbitan mono-oleate | 0.078 | 28 | 40 | 52 | 65 | — |
| 3 | Sorbitan mono-oleate | 0.234 | 15 | 25 | 33 | 61 | 73 |
| 4 | Sorbitan mono-oleate | 0.469 | 0.5 | 1 | 3 | 21 | 48 |
| 5 | Sorbitan mono-oleate | 0.781 | 0 | 0 | 0 | 0 | 24 |
| 6 | Sorbitan dioleate | 0.078 | 40 | 55 | 60 | — | — |
| 7 | Sorbitan dioleate | 0.391 | 2.0 | 2.8 | 3.0 | 4.0 | — |

The data in Table I shows quite clearly that the tests containing the inhibitors delayed the reaction of aluminum in the cement slurry.

EXAMPLE II

A series of tests were carried out in order to determine the effectiveness of different chemical inhibitors. The slurry to which the inhibitor was added consisted of 100 parts of New Orleans Lone Star Class H Cement, 46 parts of water, and 0.17 parts of aluminum. To this slurry was added various percentages of different inhibitors. Test No's 2, 3, 5, 6, 8, and 9 were prepared by mixing to the water the inhibitor, cement, and finally the aluminum. Test No's 4, 7 and 10 were prepared by mixing to the water the inhibitor, aluminum, and then the cement. The results of these tests are shown in Table II.

TABLE II

| Test No. | % Inhibitor by Weight of Dry Cement | Inhibitor | Time (min.) to Generate Given Vol. of Gas | | | |
|---|---|---|---|---|---|---|
| | | | 100 ml | 200 ml | 300 ml | 400 ml |
| 1 | .000 | — | 8 | 12 | 28 | 50 |
| 2 | .014 | Triethanol amine | 8 | 18 | 36 | 90 |
| 3 | 0.142 | Triethanol amine | 8 | 15 | 120 | — |
| 4 | 0.142 | Triethanol amine | 11 | 29 | 145 | 345 |
| 5 | .014 | Diisopropyl amine | 5 | 13 | 29 | 55 |
| 6 | 0.142 | Diisopropyl amine | 5 | 13 | 29 | 62 |
| 7 | 0.142 | Diisopropyl amine | 12 | 36 | 83 | 170 |
| 8 | .014 | Sorbitan mono-oleate | 6 | 16 | 30 | 90 |
| 9 | 0.142 | Sorbitan mono-oleate | 6 | 16 | 30 | 58 |
| 10 | 0.142 | Sorbitan mono-oleate | 18 | 50 | 108 | 195 |

The results of these tests show that the inhibitors were effective in reducing the rate of hydrogen gas generation in the cement slurry.

EXAMPLE III

A series of cement slurries were made up utilizing different cements and various amounts of sorbitan mono-oleate and aluminum. The slurries were placed in a test cell at various pressures. The water jackets surrounding the test cell were heated to different temperatures ranging from 120° and 230° F.

During each test, the temperature inside the test cell was continuously measured following pressurization of the test cell and commencing heat up of the water circulating in the water jacket. At fixed intervals, compressibility measurements were made by increasing and decreasing the test pressure by 10% and noting the volume required. From these values and the system correction, the compressibility of the slurry was calculated. The present volume of hydrogen was calculated using the effective compressibility of hydrogen at test conditions and the unreacted slurry compressibility. From percent volume of hydrogen, the mass concentration was calculated and expressed as percent of aluminum reacted.

The results of these tests are set forth in Table III.

TABLE III

DELAY IN GAS GENERATION

| Test No. | % Inhibitor by Weight of Aluminum | Test Conditions | | Initial Delay Minutes | Cement Brand-Class |
|---|---|---|---|---|---|
| | | °F. | p.s.i. | | |
| 1 | 0.0 | 120 | 2000 | 0 to 5 | Lone Star-H |
| 2 | 12.5 | 120 | 2000 | 140 | Lone Star-H |
| 3 | 12.5 | 170 | 4000 | 45 | Lone Star-H |
| 4 | 12.5 | 230 | 8000 | 75 | Lone Star-H |
| 5 | 12.5 | 130 | 5000 | 165 | Centex H |
| 6 | 5.0 | 160 | 5000 | 15 | Centex H |
| 7 | 10.0 | 160 | 5000 | 30 | Centex H |
| 8 | 15.0 | 160 | 5000 | 45 | Centex H |
| 9 | 10.0 | 120 | 3000 | 80 | Marietta-A |

Table III shows that the inhibitor proved to be very effective in retarding the rate of gas formation which was produced from the aluminum. Furthermore, the retardation of the gas generated was influenced by temperature and pressure.

EXAMPLE IV

In a developmental field test of the present invention, a casing in an offshore well in the Gulf of Mexico was cemented in accordance with the present invention.

In the developmental field test, the casing set was 9⅝ inches in diameter and the total vertical depth of the well was 7151 feet.

The cement slurry composition used was made up by mixing API Class H cement water, 2 percent by weight calcium chloride, 1.0 weight percent of a commercially available fluid loss additive, 0.331 weight percent of aluminum, and 0.0099 weight percent of sorbitan mono-oleate. The slurry had a density of 15.4 pounds per gallon. The above described cement slurry was used to cement the well. The overall cementing job was successful, and there was no gas flow to the surface via the cement filled annulus in the well.

Although certain preferred embodiments of the invention have been herein described for illustrative purposes, it will be appreciated that various modifications and innovations of the procedures and compositions recited may be effected without departure from the basic principals which underlie the invention. Changes of this type are therefore deemed to lie within the spirit and scope of the invention except as may be necessarily limited by the amended claims or reasonable equivalents thereof.

What is claimed is:

1. A cement composition for cementing an oil and gas well comprising:
   a hydraulic cement;
   water in an amount of from about 20 to about 135 percent by weight of said dry hydraulic cement;
   aluminum powder;
   an inhibitor selected from the group consisting of sorbitan mono-oleate, sorbitan dioleate, sorbitan trioleate, triethanol amine and diisopropyl amine.

2. The composition recited in claim 1 further comprising a fluid loss additive.

3. The composition recited in claim 2 wherein said fluid loss additive is selected from the group consisting of modified polysaccharides, polymerized aromatic sulfonates and mixtures thereof.

4. The composition recited in claim 3 wherein said fluid loss additive is present in an amount of at least 0.20 weight percent of said dry cement.

5. The composition recited in claim 2 further comprising an accelerator gel-preventing material.

6. The composition recited in claim 3 wherein said accelerator gel-preventing material is calcium chloride.

7. The composition recited in claim 1 wherein said hydraulic cement is a cement selected from the class consisting of Portland Cement, pozzolan cement, gypsum cement and high alumina cement.

8. The composition recited in claim 7 wherein said hydraulic cement is Portland Cement.

9. The composition recited in claim 7 wherein said inhibitor is sorbitan mono-oleate.

10. The composition recited in claim 1 wherein said inhibitor is present in the range of 0.1 percent to about 50.0 weight percent of aluminum.

11. The composition recited in claim 1 wherein said aluminum is present in the range of about 0.02 to about 2.0 weight percent of dry cement.

12. A method of cementing in an annulus between a well casing and a bore hole comprising:

placing in said annulus a cement slurry comprising a hydraulic cement;
water in an amount of from about 20 to about 135 percent by weight of said dry hydraulic cement;
aluminum powder;
an inhibitor selected from the group consisting of sorbitan mono-oleate, sorbitan dioleate, sorbitan trioleate, triethanol amine and diisopropyl amine.

13. The method of claim 12 wherein said cement slurry further comprises a fluid loss additive.

14. The method recited in claim 8 further comprising an accelerator gel-preventing material.

15. The method recited in claim 12 wherein said hydraulic cement is a cement selected from the group consisting of Portland Cements, pozzolan cements, gypsum cements, and high alumina cements.

16. The composition recited in claim 13 wherein said hydraulic cement is Portland Cement.

17. The method recited in claim 8 wherein said fluid loss additive is selected from the group consisting of: modified polysaccharides, polymerized aromatic sulfonates, and mixtures thereof.

18. The method recited in claim 8 wherein said fluid loss additive is present in an amount of at least 0.20 weight percent of said dry cement.

19. The method of claim 15 wherein the amount of gas generated in the cement slurry is from about 0.5 to about 50 volume percent of the slurry after placement of the slurry in the annulus.

20. The method of claim 8 wherein said fluid loss material is a blend of a cellulose derivative and a polymerized aromatic sulfonate.

21. The method recited in claim 12 wherein said gel-preventing material is selected from the group consisting of alkali metal halides and alkaline earth metal halides.

22. The method recited in claim 12 wherein said gel-preventing material is calcium chloride.

23. The method recited in claim 12 wherein said inhibitor is sorbitan mono-oleate.

24. The method recited in claim 12 wherein said inhibitor is present in the range of 0.1 percent to about 50.0 weight percent of aluminum.

25. The method recited in claim 12 wherein said aluminum is present in the range of about 0.02 to about 5.0 weight percent of dry cement.

* * * * *